US011247462B2

(12) United States Patent
Zhou et al.

(10) Patent No.: US 11,247,462 B2
(45) Date of Patent: Feb. 15, 2022

(54) SELECTIVE RESISTIVE SINTERING—A NEW ADDITIVE MANUFACTURING METHOD

(71) Applicant: BOARD OF TRUSTEES OF THE UNIVERSITY OF ARKANSAS, Fayetteville, AR (US)

(72) Inventors: Wenchao Zhou, Springdale, AR (US); Austin Van Horn, Little Rock, AR (US); Nicholas Holt, Fayetteville, AR (US); Lucas Galvan Marques, Fayetteville, AR (US)

(73) Assignee: Board of Trustees of the University of Arkansas, Fayetteville, AR (US)

( * ) Notice: Subject to any disclaimer, the term of this patent is extended or adjusted under 35 U.S.C. 154(b) by 0 days.

(21) Appl. No.: 16/495,381

(22) PCT Filed: Apr. 3, 2018

(86) PCT No.: PCT/US2018/025957
§ 371 (c)(1),
(2) Date: Sep. 18, 2019

(87) PCT Pub. No.: WO2018/187377
PCT Pub. Date: Oct. 11, 2018

(65) Prior Publication Data
US 2020/0047500 A1 Feb. 13, 2020

Related U.S. Application Data

(60) Provisional application No. 62/480,815, filed on Apr. 3, 2017.

(51) Int. Cl.
*B41J 2/14* (2006.01)
*B29C 64/153* (2017.01)
(Continued)

(52) U.S. Cl.
CPC ......... *B41J 2/14129* (2013.01); *B29C 64/153* (2017.08); *B29C 64/295* (2017.08);
(Continued)

(58) Field of Classification Search
CPC .. B41J 2/14129; B41J 2/33515; B41J 2/3355; B41J 2202/13; B41J 2/447; B41J 2/32;
(Continued)

(56) References Cited

U.S. PATENT DOCUMENTS 5,053,090 A 10/1991 Beaman et al.
5,303,141 A 4/1994 Batchelder et al.
(Continued)

OTHER PUBLICATIONS

United States International Searching Authority; International Search Report & Written Opinion for PCT/US2018/025957; dated Jun. 18, 2018; 18 pages; Alexandria, VA; US.
(Continued)

*Primary Examiner* — Lamson D Nguyen
(74) *Attorney, Agent, or Firm* — Keith A. Vogt; Keith Vogt Ltd.

(57) ABSTRACT

A system and method for selective heating and/or sintering of a material including first and second substrates, an array of one or more resistive heating elements arranged on a planar surface of a substrate and material to be heated located on the other substrate.

24 Claims, 13 Drawing Sheets

(51) Int. Cl.
  *B29C 64/295* (2017.01)
  *B41J 2/335* (2006.01)
  *B33Y 30/00* (2015.01)
  *B33Y 50/02* (2015.01)
(52) U.S. Cl.
  CPC ......... *B41J 2/3355* (2013.01); *B41J 2/33515* (2013.01); *B33Y 30/00* (2014.12); *B33Y 50/02* (2014.12); *B41J 2202/13* (2013.01)
(58) Field of Classification Search
  CPC ..... B29C 64/153; B29C 64/295; B33Y 30/00; B33Y 50/02
  See application file for complete search history.

(56) References Cited

U.S. PATENT DOCUMENTS

| | | |
|---|---|---|
| 5,635,968 A | 6/1997 | Bhaskar et al. |
| 5,638,101 A | 6/1997 | Keefe et al. |
| 6,589,471 B1 | 7/2003 | Khoshnevis |
| 7,110,015 B2 | 9/2006 | Chou |
| 2003/0047450 A1 | 3/2003 | Yang et al. |
| 2005/0029236 A1 | 2/2005 | Gambion et al. |
| 2008/0030538 A1 | 2/2008 | Kim |
| 2009/0243040 A1 | 10/2009 | Choi et al. |
| 2009/0245840 A1 | 10/2009 | Kaw |
| 2012/0201960 A1 | 8/2012 | Hartmann et al. |
| 2015/0190968 A1 | 7/2015 | Griszbacher |
| 2015/0367416 A1 | 12/2015 | Buller et al. |

OTHER PUBLICATIONS

M. Agarwala, D. Bourell, J. Beaman, H. Marcus, and J. Barlow, Direct selective laser sintering of metals. Rapid Prototyping Journal, 1995. 1(1): p. 26-36; 22 pages.

Y. Kathuria, Microstructuring by selective laser sintering of metallic powder. Surface and Coatings Technology, 1999. 116: p. 643-647; 5 pages.

H.R. Thomas, N. Hopkinson, and P. Erasenthiran. High speed sintering-continuing research into a new rapid manufacturing process. in Proceedings of 17th SFF Symposium, Austin, TX. 2006; 10 pages.

A. VanHorn and W. Zhou, Design and optimization of a high temperature microheater for inlget deposition. The International Journal of Advanced Manufacturing Technology: p. 1-11; 13 pages.

- Platinum
- Titanium
- Gold
- Photoresist
- Glass

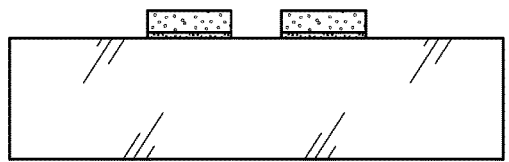
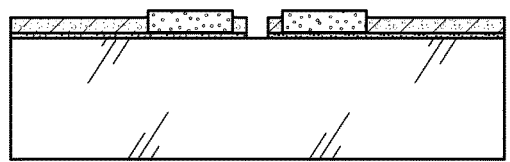
FIG. 4G
FIG. 4H
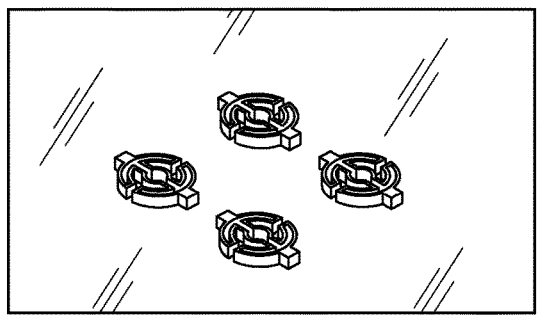
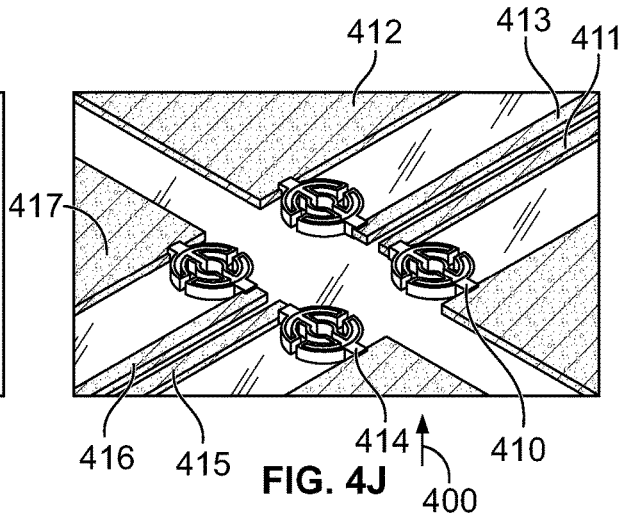
FIG. 4I
FIG. 4J
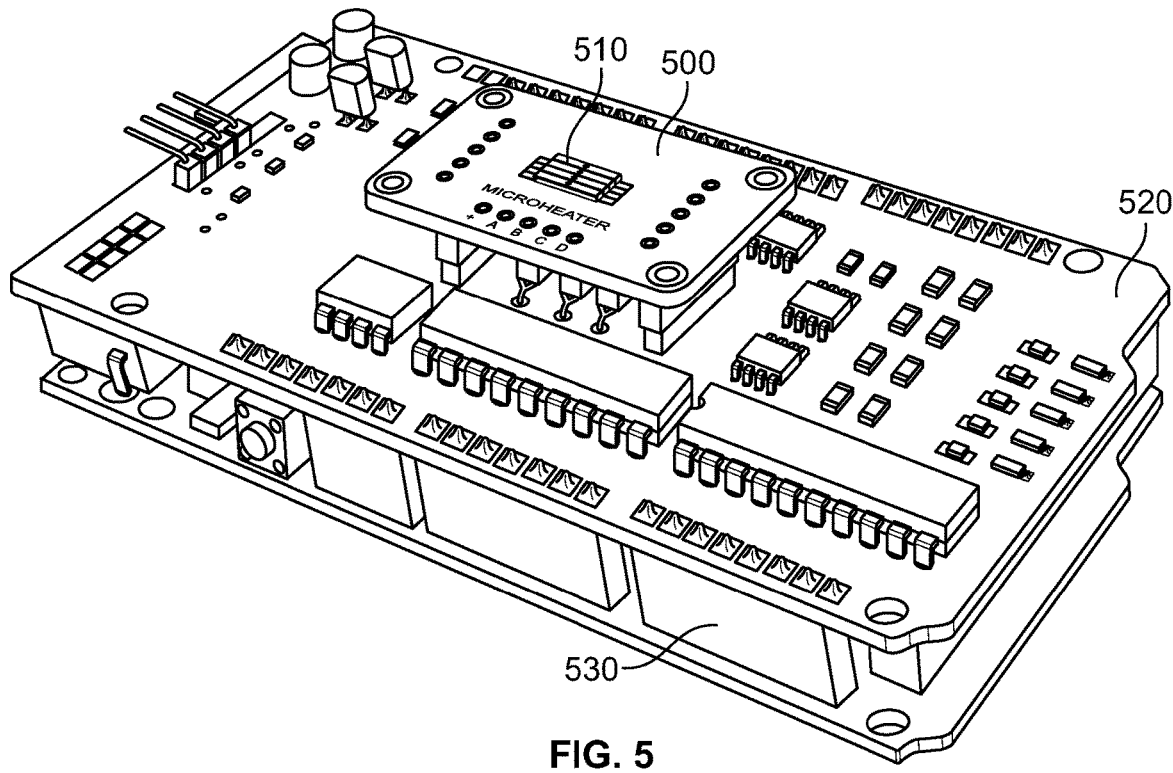
FIG. 5

SELECTIVE RESISTIVE SINTERING—A NEW ADDITIVE MANUFACTURING METHOD

RELATED APPLICATIONS

This application claims the benefit of U.S. Provisional Application No. 62/480,815 filed Apr. 3, 2017, and herein incorporated by reference.

BACKGROUND OF THE INVENTION

Selective laser sintering (SLS), and its variants (e.g., electron beam melting), uses an energy beam as the energy source to selectively induce fusion between powder particles layer by layer to build 3D structures. However, the SLS and EBM processes suffer from slow manufacturing speed, which is primarily limited by the point-wise scanning process. Several other powder-bed processes have been developed or are under development to address this issue, including multi-beam laser additive manufacturing (MB-LAM), selective mask sintering (SMS), high-speed sintering (HSS), selective inhibition sintering (SIS), selective heat sintering (SHS), and binder jetting.

Although these processes, as they are further developed, may improve 3D printing, they have two main drawbacks. One is the energy source for sintering. Infrared radiation is an indirect energy source that needs to be converted into heat for sintering, which often imposes material-specific limitations and requires extra time for the powder to absorb the radiation. The second drawback is the exposure timescale. Sintering typically takes place in a few milliseconds in SLS systems when laser or electron beam scan over the powder particles (~100 μm) at a speed of ~100s mm/s due to the high-energy density of laser or electron beam (i.e., each particle get exposure for ~1 ms), while it generally requires much longer exposure time (~1 s) for the aforementioned processes that use infrared radiation.

Another disadvantage is that in printed electronics, which is usually done by printing metal nanoparticle suspension ink on a plastic substrate, ink is typically dried and sintered (usually in an oven) to make conductive circuits. The challenge is that the sintering temperature is usually limited by the highest temperature the plastic substrate can stand (usually below 300 C) and therefore the conductivity of the sintered nanoparticles is usually much worse than the bulk metal conductivity.

As will be discussed below, the embodiments of the present invention overcome the above-mentioned limitations in the current technology, as well as others.

BRIEF SUMMARY OF THE INVENTION

In one embodiment, the present invention provides a process that uses a high-temperature microheater array to create and apply a heat pattern directly to the powder particles in a non-contact manner, which can deliver very high energy density in a few milliseconds for fast sintering. In yet other embodiments, the present invention provides a microheater array powder sintering (MAPS) system.

In yet other embodiments, the present invention provides a focused energy pattern for sintering powder particles at low cost and high energy efficiency.

In other embodiments, the present invention increases printing speed by the ability to scale to the number of microheaters in an array and therefore make additive manufacturing a viable approach for high-volume production.

In still further embodiments, the present invention provides a one-step approach for sintering nanoparticles on plastic substrates by delivering focused heat patterns, which can overcome the limitation of the sintering temperature by rapidly heating (i.e., controlling the heating time to milliseconds) such that the plastic substrate will not be damaged.

In yet other embodiments, the present invention improves existing selective laser sintering (SLS) technology by using a scalable array as an energy source to replace the laser.

In yet other embodiments, the present invention can significantly boost the printing speed of SLS by using a large array of elements in the energy source. Each element can print at a similar speed to SLS. Therefore, the embodiments of the present invention, are able to print one layer at a time instead of one point at a time for SLS.

In yet other embodiments, the present invention may reduce energy consumption by 100 times or more. Each element in the energy source consumes ~100s milliwatts of power while similar SLS needs a laser with significantly more power.

In yet other embodiments, the present invention provides a printhead that may be made at low cost such that it can be disposable while a laser can easily cost over ~$10,000+ and requires high maintenance.

In yet other embodiments, the present invention provides individual elements in the energy source array that may be of different sizes to achieve different resolution even in the same print.

In yet other embodiments, the present invention further uses an energy source that also functions as a sensor, which can be used for in-situ monitoring of the process, which is one of the most significant drawbacks associated with SLS.

Unlike some other fast production methods for printing flexible electronics that are often limited by the speed of the curing step, but also rely on large costs associated with tooling and equipment, the embodiments of the present invention offer several advantages over the existing technologies. One advantage the present invention provides is a non-impact method, thus eliminating the need for creating new masks or stamps for each print. Another advantage the present invention provides is a scalable printhead design, which can be exploited to increase speeds similarly to an inkjet. Another advantage the present invention provides is that it eliminates the need for post-drying and -curing of the ink since sintering of the metals occurs during printing.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 3 is a comparison in terms of a capacity metric (N represents number of cognitive engine trials).

FIG. 4G illustrates the fabrication steps of the microheater array using the steps shown in FIGS. 4A-4D.

FIG. 4H illustrates the fabrication steps of the microheater array using the steps shown in FIGS. 4A-4D.

FIG. 4I illustrates the fabrication steps of the microheater array using the steps shown in FIGS. 4A-4D.

FIG. 4J illustrates the fabrication steps of the microheater array using the steps shown in FIGS. 4A-4D.

FIG. 5 illustrates a microheater package that may be used with the embodiments of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1A:
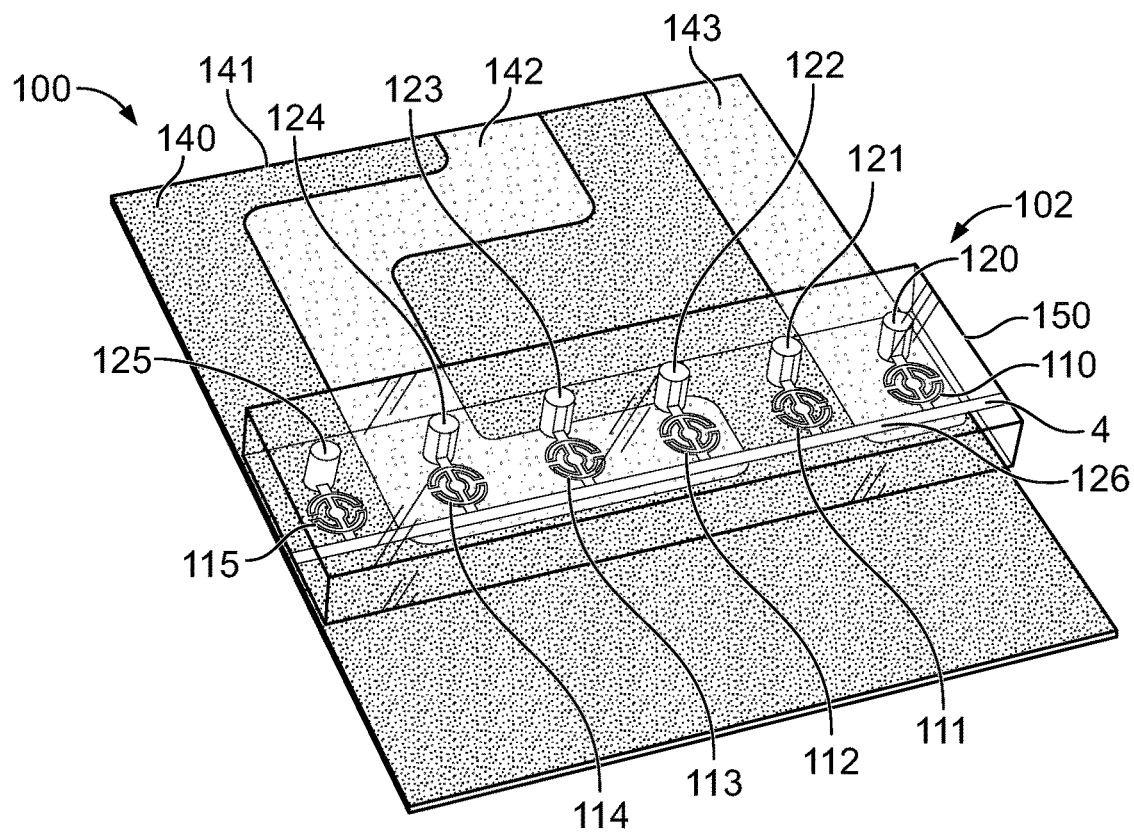
FIG. 1A illustrates one embodiment of the present invention showing how the powder particles underneath the selectively activated microheaters are sintered as the printhead moves over the area to be printed.

In general, as shown in FIG. 1A, general embodiments of the present invention provide a microheater 100 having a heating array 102 that is comprised of one or more resistive heating elements 110-115 that may be resistive filaments miniaturized to ~100 nm to ~100 µm typically with MEMS fabrication techniques. The filaments are generally made of heating materials such as titanium, platinum, molybdenum, tungsten, or polysilicon. Using molybdenum disilicide may achieve operating temperatures of over 1000° C. Characteristics of these thin film microheaters are low power consumption, fast response, good heat confinement, good mechanical stability, and good fabrication yield.

Applications for the embodiments of the present invention include micro-ignition for micropropulsion systems and microexplosive boiling. Microheaters may be used in both 2D and 3D printing systems such as inkjet printing, thermal printing commonly used in a point-of-sale (POS) printer, and selective heat sintering (SHS). In a particular application, the embodiments of the present invention may be used with unsintered powder or ink 140 on a substrate 141 to create patterns of sintered powder or ink 142 and 143. In other embodiments, any material that reacts with heat may be used.

In other aspects, the microheaters of the present invention are generally built on a substrate or base 150. In a preferred embodiment, base 150 may be made of glass or silicon. Sapphire, langasite, and alumina substrates may also be used to achieve higher temperature microheaters. Glass may be used because of its low thermal conductivity. Silicon may also be used despite its high thermal conductivity due to its ease of processing with MEMS fabrication.

Silicon underneath the microheater can be etched away to leave the microheater on a thin membrane of dielectric material to increase power efficiency. The typical process flow to fabricating a heater using MEMS techniques is to grow a dielectric layer, use photolithography to pattern the substrate 150 then deposit the microheater 110-115 material and conductive leads 120-125 and 126 using sputtering or e-beam evaporation. Some important considerations in designing microheaters are the heat transfer characteristics, geometry, and thermal response time.

Figure 1B:
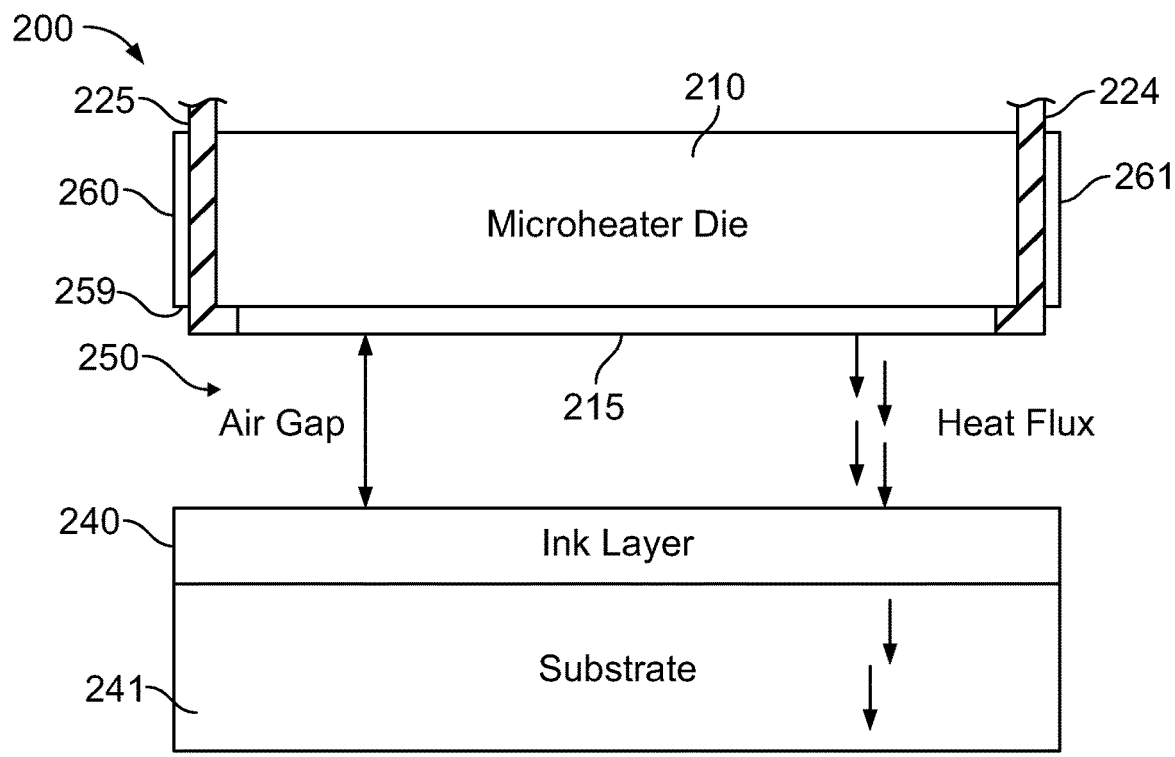
FIG. 1B illustrates another embodiment of the present invention.

FIG. 1B depicts another embodiment of the present invention. Provided are system 200 which includes microheater die, base or substrate 210 which has one or more heating elements 215. Heating elements 215 are electronically connected to control systems via interconnects or electrical contacts 224 and 225 which may extend away from the heating elements and gap 250 by passing through vias as shown above in FIG. 1A. Alternatively, interconnects or electrical contacts 224 and 225 may extend away from gap 250 by traveling along surface 259 and then extend away from gap 250 along edges 260 and 261. These arrangements keep gap 250 free from any extraneous structure that may interfere with the heating of surface 240.

Surface 240 may be supported by substrate 241. In still another preferred embodiment, the system is adapted to maintain a parallel relationship between one or more and heating elements 215 and surface 240 while maintaining gap 250.

Figure 2:
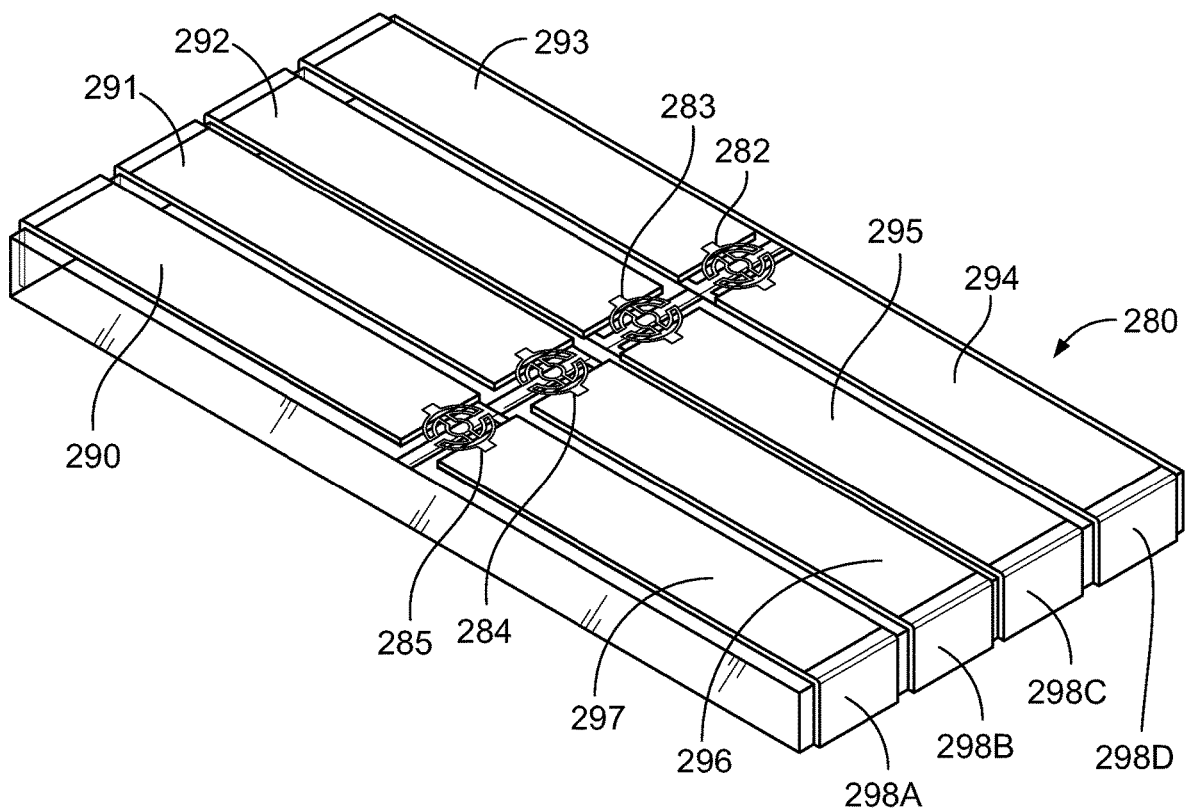
FIG. 2 illustrates another embodiment of the present invention.

FIG. 2 illustrates another printing array 280 that may be used with the various embodiments of the present invention. Array 280 includes a plurality of microheaters or filaments 282-285 which are connected to control circuitry by interconnects or leads 290-297. As is shown to avoid additional structure from entering the gap between the heating elements and the to-be-acted-upon surface, the interconnects are in communication with additional control circuitry by edges 298A-298D.

As stated above, an important design aspect of the microheater die used for MAPS other embodiments is that the microheater must be able to approach the substrate to form a gap of only a few microns to a few hundred microns. This makes it necessary to eliminate any wire bonding or other electrical connections that may protrude out of the surface of the microheater die. As discussed above, one approach to accomplish this is to connect the microheater to the external control circuit from the other side of the die, which can be done using a glass wafer with through-vias as illustrated in FIGS. 1A and 1B. These designs may be an ideal solution for mass production. When only small batches of microheater dies are required, it is sufficient to place the leads along the sides of the die to enable electrical connections to the other side of the die as shown in FIG. 2.

The microheaters described above may transfer heat in three modes: conduction, convection, and radiation. Of these three modes, the conduction and convection are significant while radiation is insignificant at temperatures less than ~700° C. for Ti or Pt microheaters. Geometries of the heaters may also be optimized for power savings, reduced stress profiles and optimal heat distribution for sintering at different resolution. Thermal response time is also a consideration to the operation of a microheater, particularly in the MAPS application.

In one embodiment, a thermal response time of 2 ms for a temperature of 600° C. was achieved with tungsten microheaters with a power consumption of 1.2 W. A thermal response time of 1 ms was achieved with a Pt/Ti heater reaching a temperature of 600° C. using only 1 W of power.

Packaging may be used as a container for the heaters. Materials for packaging are chosen to withstand the operating conditions, which could be a high-temperature operation, high pressure, chemical resistance, mechanical and thermal shock, and vibration. Metals, ceramics, silicon, and plastics may be used for microheater packaging. Metals are good for their robustness ease of assembly, mechanical integrity, and chemical inertness in harsh environments. Ceramics may also be used due to the ease of shaping and their material properties such as electrically insulating, hermetic sealing, thermal conductivity and chemical inertness.

The one or more microheaters of the present invention are essentially very small resistance heaters, as such, they operate by passing an electric current across the filament to generate heat. Since the response time of a microheater is generally very fast, a sophisticated feedback system is provided to control the temperature. In a preferred embodiment, a feedback system which allows a 1-ms thermal response time may be used. PID controls may be used to control the temperature of the microheater. The feedback control for a microheater relies on the fact that the resistance of the heater changes with its temperature. This allows the heater itself to act as a temperature sensor.

Figure 3:
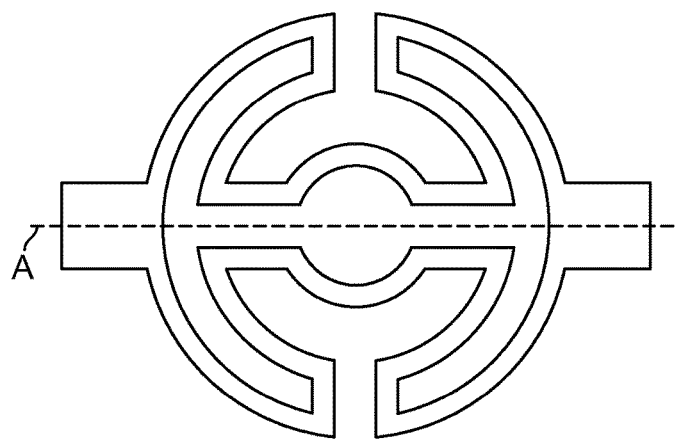
FIG. 3 illustrates a heater geometry that may be used with the embodiments of the present invention.
Figure 4A:
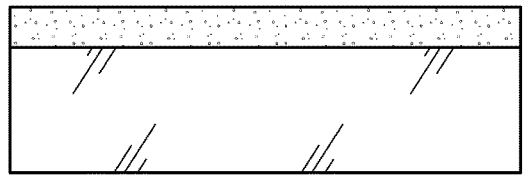
FIG. 4A illustrates the fabrication steps of the microheater array wherein the glass wafer is coated with a layer of photoresist.
Figure 4B:
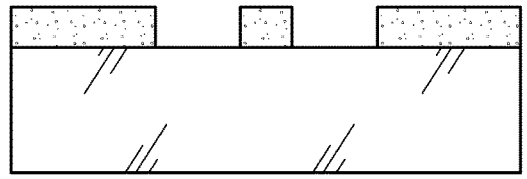
FIG. 4B illustrates the fabrication steps of the microheater array wherein the photoresist is exposed using the microheater mask and etched.
Figure 4C:
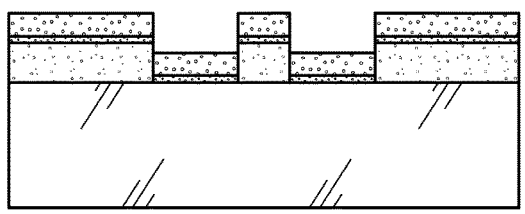
FIG. 4C illustrates the fabrication steps of the microheater array wherein an adhesion layer of Ti followed by Pt filaments is deposited.
Figure 4D:
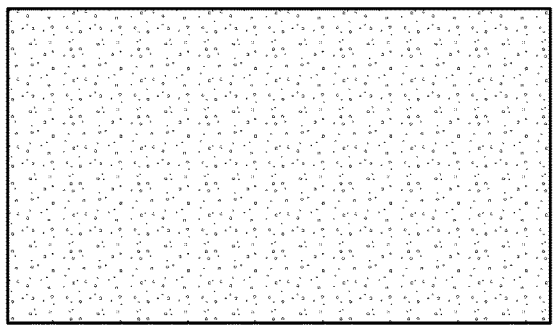
FIG. 4D illustrates the fabrication steps of the microheater array wherein the photoresist is removed using acetone.
Figure 4E:
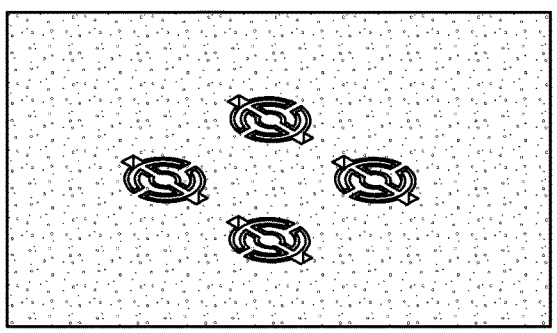
FIG. 4E illustrates the fabrication steps of the microheater array wherein an adhesion layer of Ti followed by Au leads are deposited using the same procedure in steps shown in FIGS. 4A-4D.
Figure 4F:
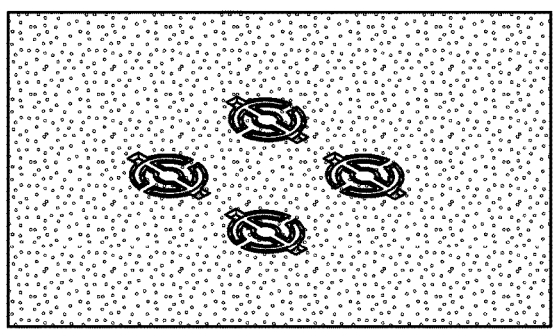
FIG. 4F illustrates the fabrication steps of the microheater array using the steps shown in FIGS. 4A-4D.

In another embodiment of the present, an optimized microheater design is shown in FIG. 3. Design optimizations of the heater may include varying the size of each heater, the number of filaments comprising each heater, the geometry of the filaments, the density of the filaments, and materials making up the filaments may vary as well. In other embodiments, a microheater with the following criteria is preferred: a maximum temperature of 600° C. with a response time of 1 ms. Platinum may be used as the filament material due to its oxidation resistance and ability to reach the target temperature, and a Schott's AF 32 eco glass wafer was chosen as a substrate due to its low thermal conductivity and high glass transition temperature of 717° C. In other embodiments, the heaters may be scalable configured in a 2×2 array 400, as can be seen in FIG. 4E. The arrays may be comprised of one or more heaters, columns and rows of heaters, as well as tens to thousands of heaters per array.

The heater arrangements described above may be manufactured using MEMS fabrication techniques. E-beam evaporation may be used to deposit the microheater filaments and conductive leads. As shown in FIGS. 4A-4J, a 500-μm thick AF 32 eco glass wafer from Schott Inc. was used. The wafer was cleaned using acetone and isopropyl alcohol, then rinsed with DI water and dried. AZ 5214-E photoresist was spin coated to a thickness of 2 μm and prebaked. UV photolithography was performed using the microheater mask, followed by post-baking and a second blanket exposure. The photoresist was etched using AZ MIF 300 developer. E-beam evaporation was used to deposit 100 Å of titanium or tantalum (adhesion layer) followed by 1500 Å of platinum (heater filaments). Lift-off of the photoresist and metal layer was achieved using acetone in an ultrasonic bath. A second photolithography stage identical to that previously mentioned was used to pattern the wafer using the leads mask. E-beam evaporation was used to deposit 100 Å of titanium or tantalum followed by 1000 Å of gold. Lift-off of the photoresist and metal layer was achieved using acetone in an ultrasonic bath. The dies were cut using a dicing saw such that the gold leads extended to the edge of the die.

After the heaters are fabricated onto the glass substrate, the wafer was diced into the individual heater dies, consisting of four microheaters in array 400 and leads 410-417.

The packaging of the microheater should accomplish the following tasks: 1. Provide a fixture of the heater die to the rest of the printer assembly; 2. Provide a method of electrical connection to the heaters; 3. Allow the microheaters to approach a flat substrate to a distance of as small as a few microns.

As shown in FIG. 5, microheater package 500 including microheater die 510 may be further connected to a temperature control circuit 520 as well as other control circuitry 530. Precise control of the temperature of the microheater is a consideration. Ideally, the microheater should ramp to its target temperature of 600° C. in 1 ms and be maintained at that temperature until sintering is complete. It is also critical that the temperature of the microheater does not too far exceed the target temperature or else there is a risk of damaging the microheater. Because of these requirements, a sophisticated feedback control may be deployed.

In a preferred embodiment, the microheater temperature is controlled by a PID controller. A closed-loop control may also be used which is based on the temperature resistivity relation of the microheater which acts as the temperature sensor.

Figure 6:
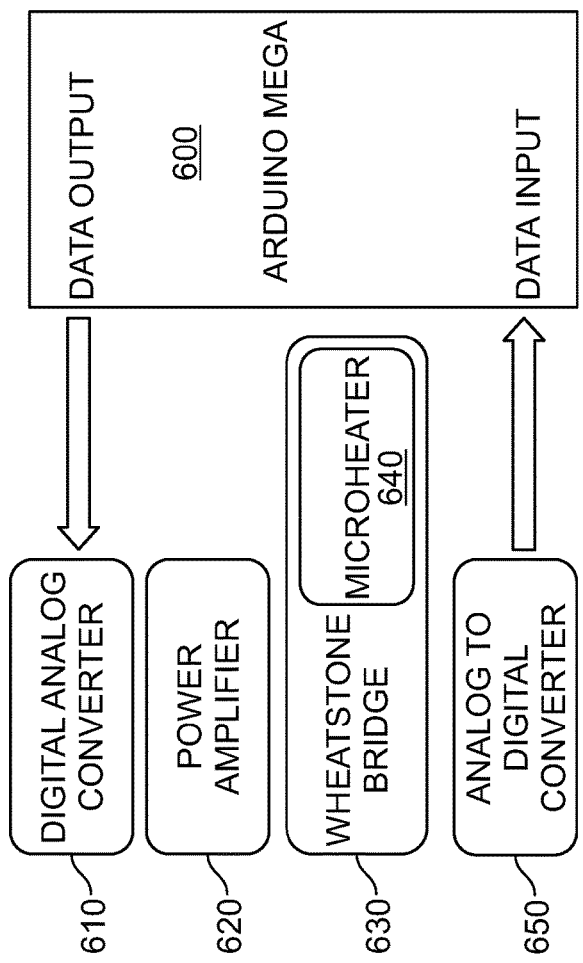
FIG. 6 illustrates a block diagram of the microheater control unit that may be used with the embodiments of the present invention.

FIG. 6 illustrates the control loop of the microheater temperature. All data is processed by a microcontroller 600 which may be n 8-bit microcontroller board Arduino Mega. The microcontroller data output which is converted to an analog voltage between 0 and 10 V by a digital-to-analog converter 610 (DAC). The signal goes through the power amplifier 620 to ensure that enough power will be delivered to the Wheatstone bridge 630 where the microheater 640 is connected. The voltage difference in the Wheatstone bridge between the point 700 and point 710 (FIG. 7) is converted by the analog-to-digital converter (ADC) and sent back to the controller 600 where the resistance of the microheater 640 is calculated. Based on the temperature-resistance relation, the temperature of the microheater is calculated, and the control voltage output is updated to keep the microheater temperature around the target temperature.

The microheater resistance Rm is calculated using three known resistors in the Wheatstone bridge as shown in Eq. 1.

$$R_m = \left( \frac{R2^* R3 + \left( R3^*(R1 + R2)^* \frac{ADC \text{ Voltage}}{DAC \text{ Voltage}} \right)}{R1 - \left( (R1 + R2)^* \frac{ADC \text{ Voltage}}{DAC \text{ Voltage}} \right)} \right). \quad (1)$$

Figure 7:
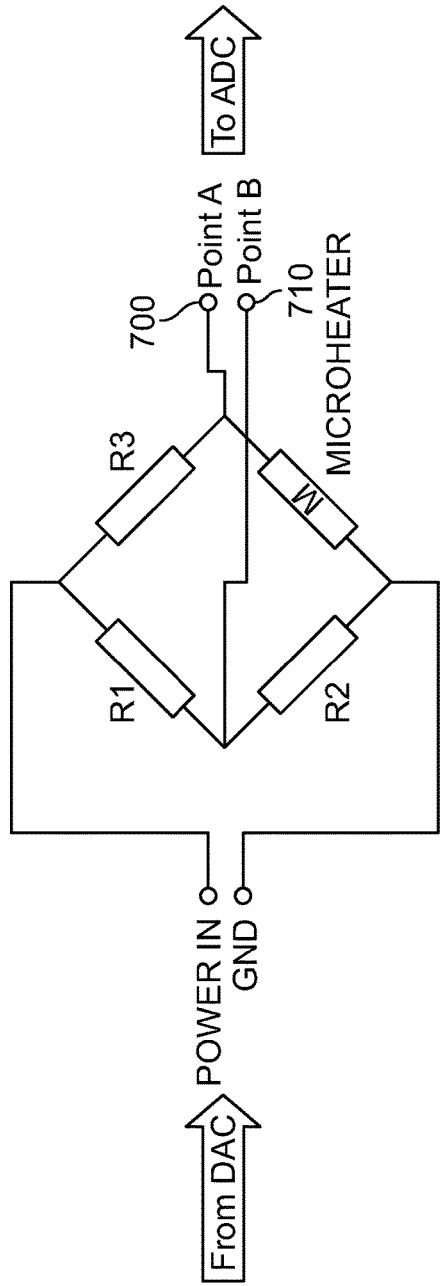
FIG. 7 illustrates a microheater package that may be used with the embodiments of the present invention.
Figure 8:
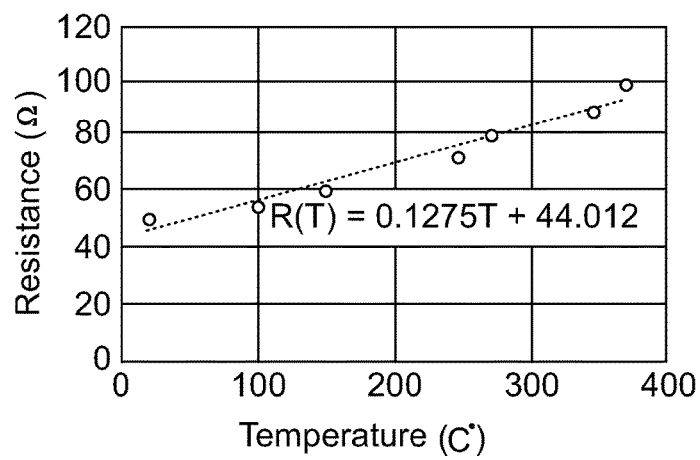
FIG. 8 illustrates how the microheater is connected to the Wheatstone bridge for embodiments of the present invention.
Figure 9A:
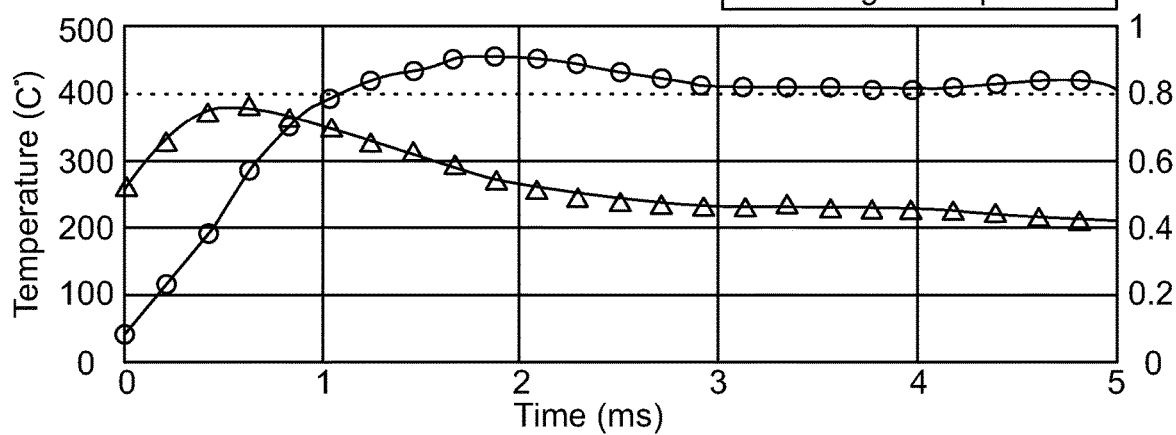
FIG. 9A illustrates a Pt microheater being heated to a target temperature of 400° C. in 1 ms for embodiments of the present invention.
Figure 9B:
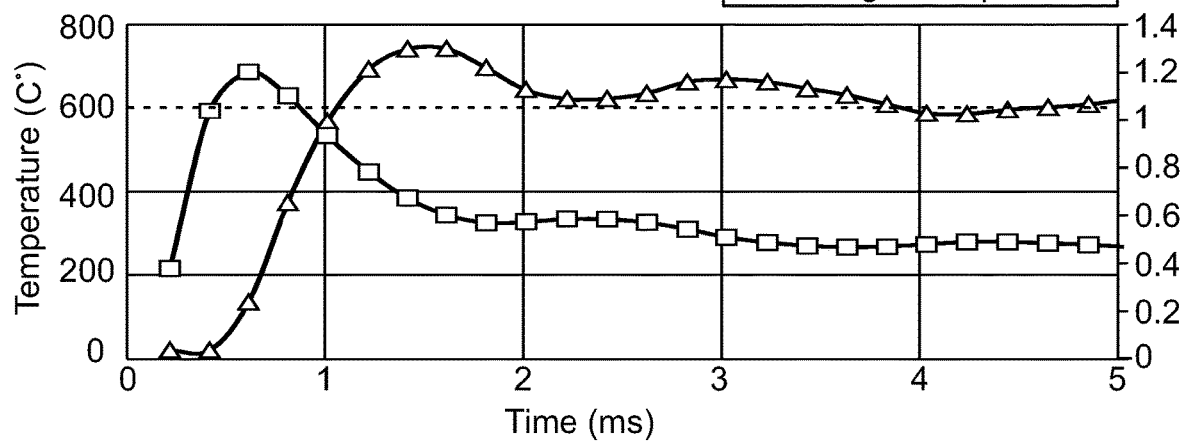
FIG. 9B illustrates a Pt microheater being heated to a target temperature of 600° C. in 1 ms for embodiments of the present invention.
Figure 10:
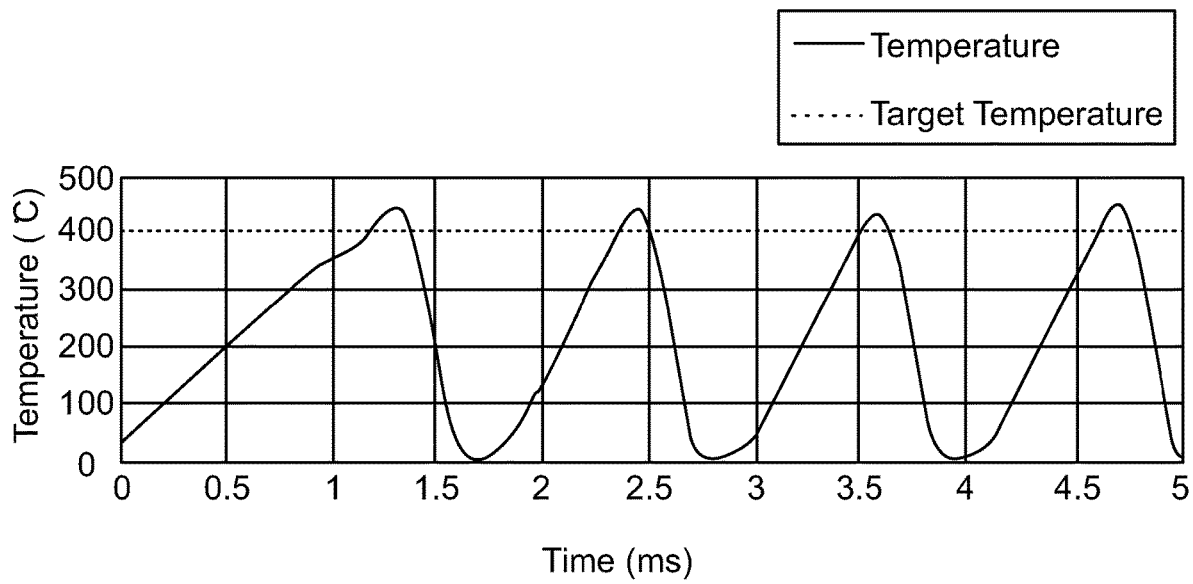
FIG. 10 illustrates the cycling of the Pt heater on and off resulted in a response time of less than 1 ms to heat up and cool down again for embodiments of the present invention.

Using PID control, the microheater was brought to 600° C. in 1 ms and temperature was maintained. the temperature-resistance relationship is shown in FIG. 8. The resistance of the microheater was found by measuring the DAC and ADC voltages as shown in FIG. 7 and then calculated using Eq. 1. This was accomplished with only a maximum of 0.8 W power consumption. The change of temperature and power consumption over time are shown in FIG. 9, which shows the designed circuit can effectively raise and maintain the microheater temperature to the target temperature in the desired timescale. Additionally, because the microheater may be turned on and off to selectively sinter powder particles, it was desired to determine a cycling frequency for the microheater operation for the various embodiments including the MAPS process. For this test, the microheater was heated to the target temperature of 600° C. then allowed to cool until reaching room temperature by natural cooling (i.e., no assistive cooling mechanism is used) at which point it is ramped up again, etc. The results of this test are shown in FIG. 10. It shows the designed microheater and temperature control circuit can meet the requirements of quickly turning the heaters on and off to achieve a thermal response time of less than 1 ms.

Figure 11:
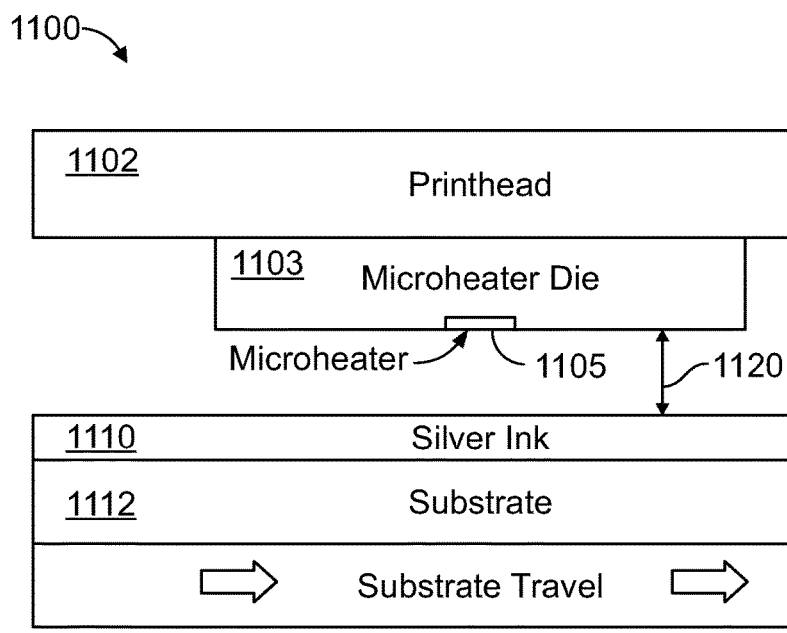
FIG. 11 illustrates the processing parameters of a printing process showing how a microheater die is suspended over an ink layer as they move relative to each other for embodiments of the present invention.

FIG. 11 illustrates another embodiment of the present invention providing a printing system 1100 including printhead 1102, microheater die or array 1103 of one or more microheaters 1105. Also provided is gap 1120 between array 1103 and sintering layer 1110 filled with a conducting medium, such as air, helium or plasma. The system may also include a drive or drives (not shown) that move the substrate 1112, microheater die 1103, or both horizontally relative to each other without affecting the air gap.

In yet another embodiment, the present invention provides a printing area, an automated mechanism to move the printing substrate relative to the microheater, and the motion between the microheater and substrate must be allowed in a digitally controlled manner for consistent printing to occur. In addition, a consistent air gap should be maintained. In a preferred embodiment, the air gap is around 5±3 µm. Too large of an air gap will affect the sintering of the nanoparticles, while too small of an air gap risks contact between the microheater and substrate. Lastly, the parallelism between the microheater die and the substrate must be established and maintained over the printing area.

Figure 12:
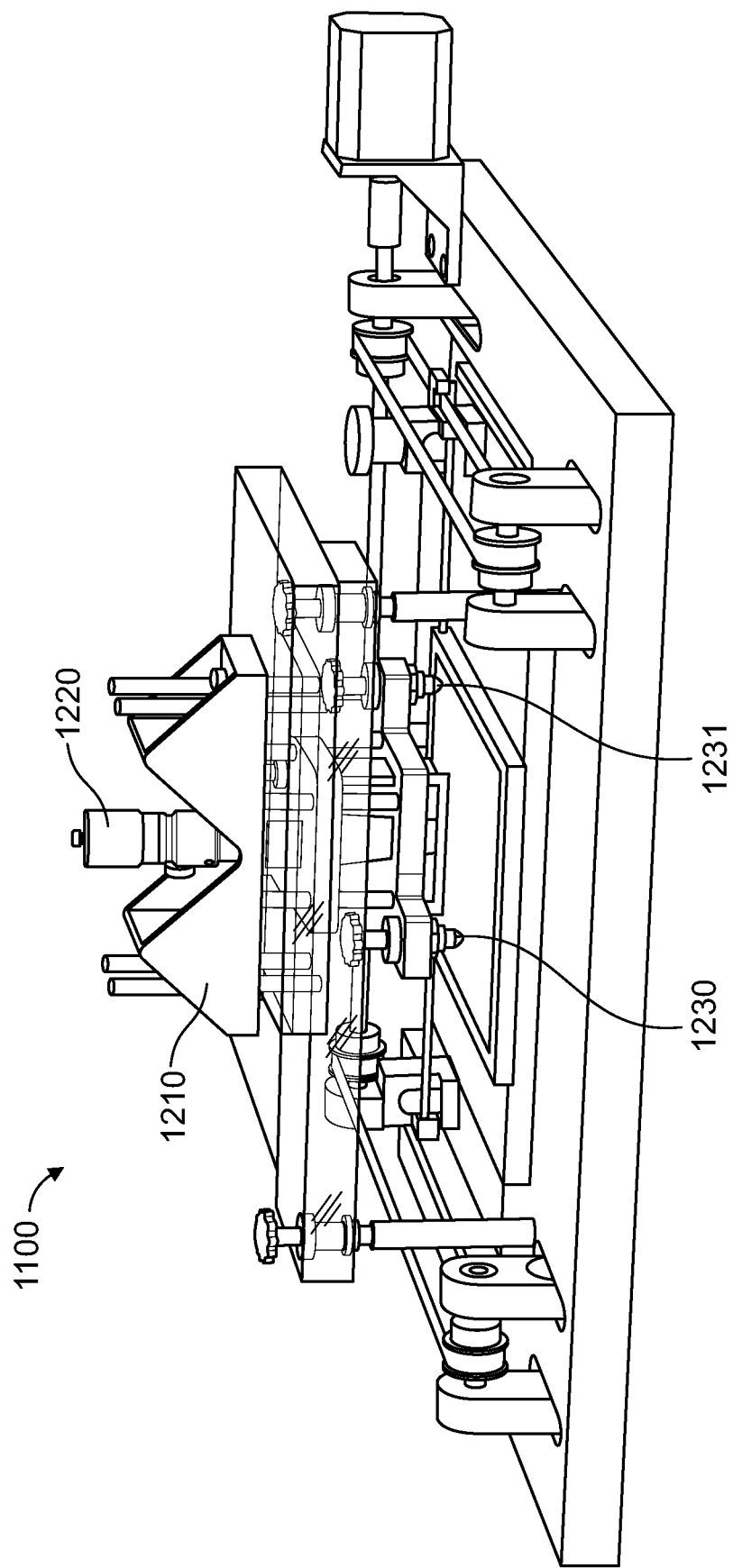
FIG. 12 is an overview of printer assembly wherein a substrate carrier supports an area having a range of motion, the substrate carrier is enabled by a stepper motor, the microheater die's vertical position and level are adjustable using features of the printhead for embodiments of the present invention.
Figure 13:
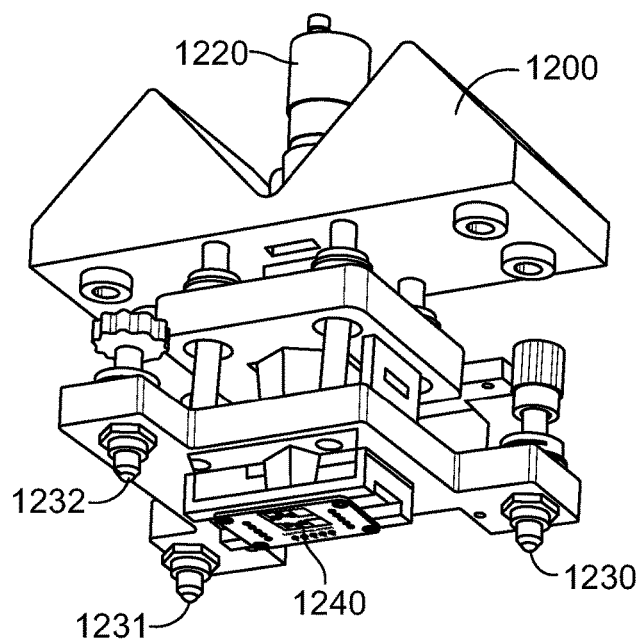
FIG. 13 is an overview of a printhead assembly that is capable of precise positioning and leveling of the microheater, which is mounted to a linear motion for embodiments of the present invention.

As shown in FIGS. 12 and 13, system 1200 which may be a MAPS system may also be configured so that a microheater may be connected to printhead 1210 that includes a linear motion carriage. The microheater may be adjusted in a vertical position by a micrometer 1220 or similar device. The level of the microheater can be adjusted by manipulating a plurality of supports 1230-1232, which are adjustment screws available from Newport.

As shown in FIG. 13, printhead assembly 1200 serves the following purposes: 1. It suspends the microheater 1240 over the substrate: the microheater is attached to the bottom of the printhead 1200, which remains stationary during printer operation. 2. It provides a mechanism for leveling the microheater by means of the adjustment screws, which act as supports. 3. It provides a mechanism for adjusting the air gap by adjusting the height of the microheater with a micrometer.

Figure 14A:
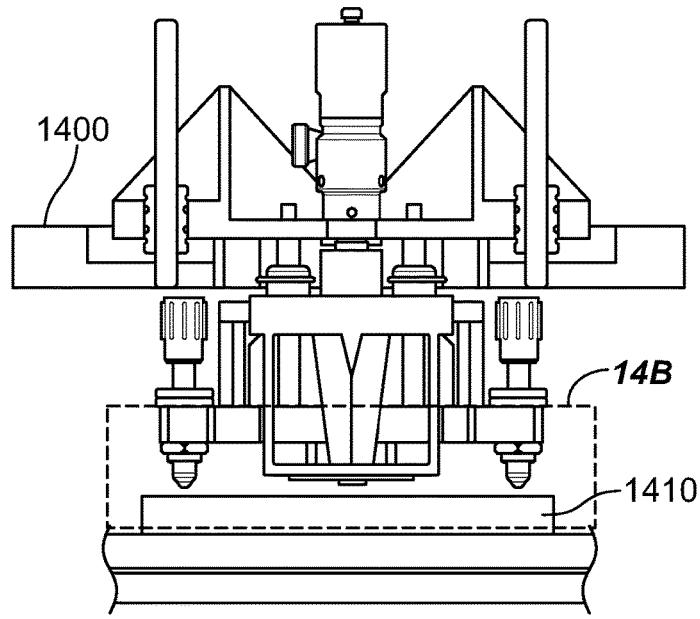
FIG. 14A illustrates the interface between the printhead and the substrate which allows the printhead to float with respect to the substrate for embodiments of the present invention.
Figure 14B:
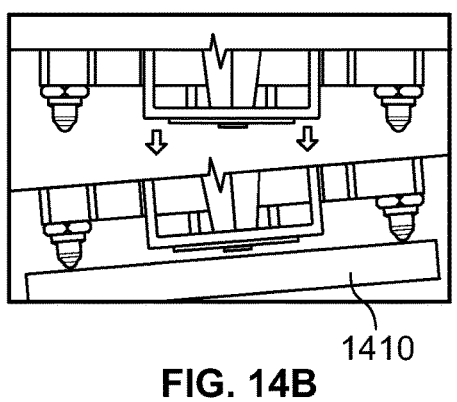
FIG. 14B illustrates the interface between the printhead and the substrate wherein the printhead rests directly on top of the substrate rather than be suspended over it for embodiments of the present invention.

In other embodiments, the present invention provides a system to move the substrate underneath the microheater, the microheater over the substrate, or to have both components move relative to one another. In other aspects, during printing, the substrate is placed on top of the substrate carrier. Because the printhead is not suspended over the printing stage but instead rests directly on top of the substrate, the printhead mount must only hold the printhead assembly in place during operation. As shown in FIG. 14A print assembly 1400 is configured to float with respect to substrate 1410. This may be accomplished by suspending assembly 1400 over the substrate using streams of air or magnetic levitation. In other embodiments as shown in FIG. 14B, floating may be accomplished by the use of supports such as supports 1230-1232 that permit the assembly to rest on substrate 1410. The interface allows the printhead to rest or float on the substrate rather than be suspended and ensure the parallelism between the microheater and the substrate.

Figure 15:
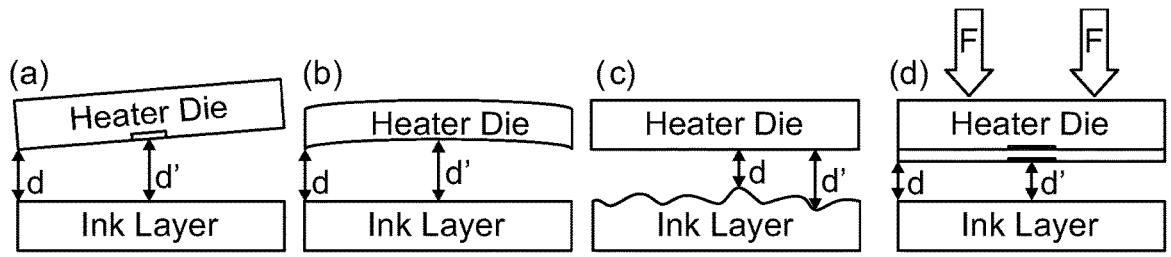
FIGS. 15A, 15B, 15C and 15D illustrate four factors that can affect the tolerance of the air gap between the heater die and the ink layer. The variable d represents the desired air gap, while d' represents the actual air gap after accounting for any the following factors: (a) parallelism, (b) flatness, (c) roughness, and (d) deflection.

Once the air gap has been established between the face of the microheater die and the ink layer, it can be affected by several factors, as illustrated in FIG. 15: parallelism, the flatness of each surface, the surface roughness of each surface, and the deflection of components onto which the surfaces mount.

Parallelism is concerned with how the microheater die can be suspended over the substrate. To make two planar surfaces parallel, it is necessary to have very fine control of the relative tilt angles and the distance between the surfaces. As was discussed above, the face of the microheater die may be adjusted relative to a reference plane made with the plurality of supports 1230-1232. A contact sensor may be used to determine the vertical displacement of the microheater die with respect to the reference plane; similarly, the tilt of the microheater can be dialed in by using a contact sensor on each corner of the microheater die.

Figure 16:
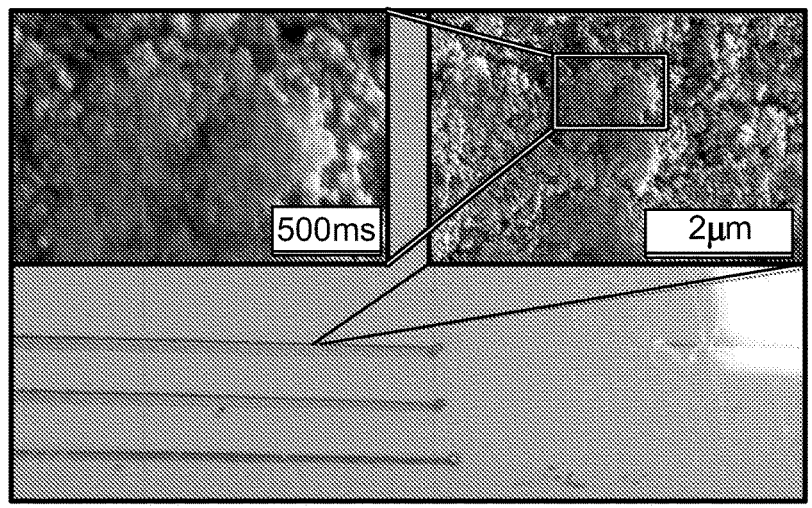
FIG. 16 illustrates conductive lines printed using an embodiment of the present invention which shows the top layer of the lines to have been fully melted by the microheater.

Several conductive lines were printed using the embodiments of the present invention. The conductive line was viewed under a scanning electron microscope (SEM) to determine whether sintering had taken place, as shown in FIG. 16. There are clear signs that parts of the silver nanoparticles were melted and re-solidified. This is because the microheater when operating at 600° C., can heat the silver nanoparticles to 440° C.

Figure 17:
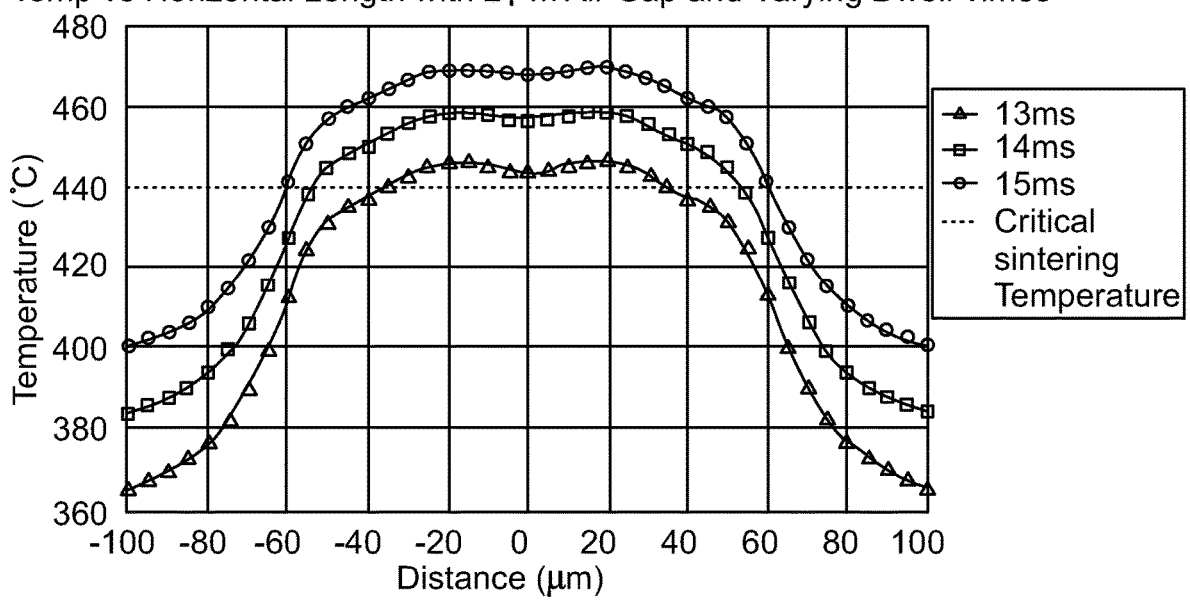
FIG. 17 illustrates temperature of the material underneath the microheater to show resolution wherein the horizontal line represents a critical sintering temperature of 440° C. above which any powder will be sintered and for dwell times of 13, 14 and 15 ms, a resolution of 70, 100 and 120 m is achieved, respectively.

Another parameter that is controllable by the embodiments of the present invention is printing resolution or temperature profile of each heater. This was demonstrated by observing the temperature distribution on the surface of the nanoparticles. The temperature was sampled every 5 μm on the surface of silver nanoparticles along the centerline of the microheater as illustrated in FIG. 3 by the dotted line "A" found at the x-axis and extending 50 μm outside the heater. It was observed that there is a sharp decline in the temperature beyond 50 μm in either direction from the center of the microheater. The dwell time can be changed to increase or decrease the temperature over this area. The dwell time could be adjusted to accommodate another material with a different required sintering temperature or to achieve a different printing resolution; this is illustrated in FIG. 17. It was established previously that a temperature of 440.0 is needed for fast sintering of the silver nanoparticles, so in a 100 μm resolution can be achieved by setting the dwell time to be 14 ms.

A key to improving performance is to maximize the heat flux into the particles and to minimize the heat flux out of the particles. Heat flux is determined by thermal conductivity and temperature gradient as shown in the Eq. (3):

$$q_s = -\frac{k \partial T}{\partial X} \quad (3)$$

Figure 18:
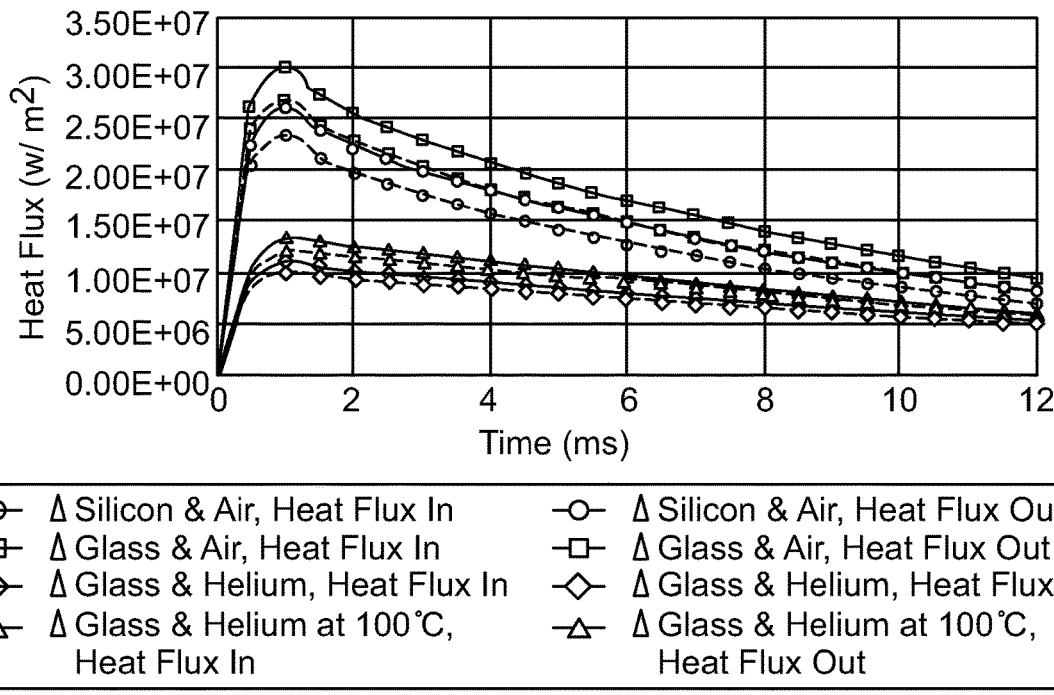
FIG. 18 shows heat flux profiles for each case in Table 3.
Figure 19:
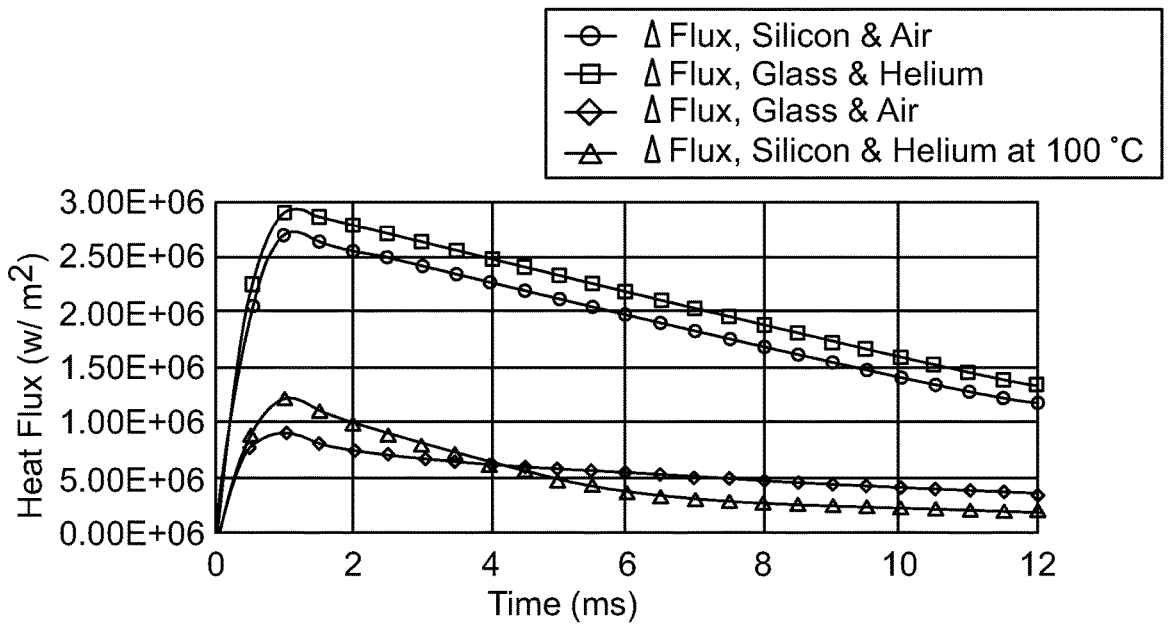
FIG. 19 shows heat flux profiles for each case.

In this equation, $q_s$ is the heat flux out of the surface of the particles. Therefore, to minimize the heat flux out of the particles, the objective is to reduce the thermal conductivity of the printing substrate and to minimize the temperature gradient ∂T/∂x between the surface of the printing substrate and the particles to be sintered. On the other hand, to maximize the heat flux into the powder particles, the thermal conductivity of the medium needs to be increased, and the temperature gradient between the heater and the particles to be sintered needs to be maximized FIG. 18 shows that the heat flux reaches a maximum near 1 ms, which is when the heater reaches its operating temperature. It is important to realize that heat will be added to this system when the heat flux into the particles is greater than the heat flux out of the particles, and a larger difference between these two is most desired; FIG. 19 illustrates this relationship between the cases found in Table 3.

TABLE 3

| Case | Substrate | Medium | Initial Powder Bed Temperature (° C.) | Purpose |
|---|---|---|---|---|
| 1 | Silicon | Air | 20 | Benchmark |
| 2 | Glass | Air | 20 | Reduce heat flux out of particles (same as before) |
| 3 | Glass | Helium | 20 | Increase heat flux into particles |
| 4 | Glass | Helium | 100 | Heat system before sintering |

Figure 20:
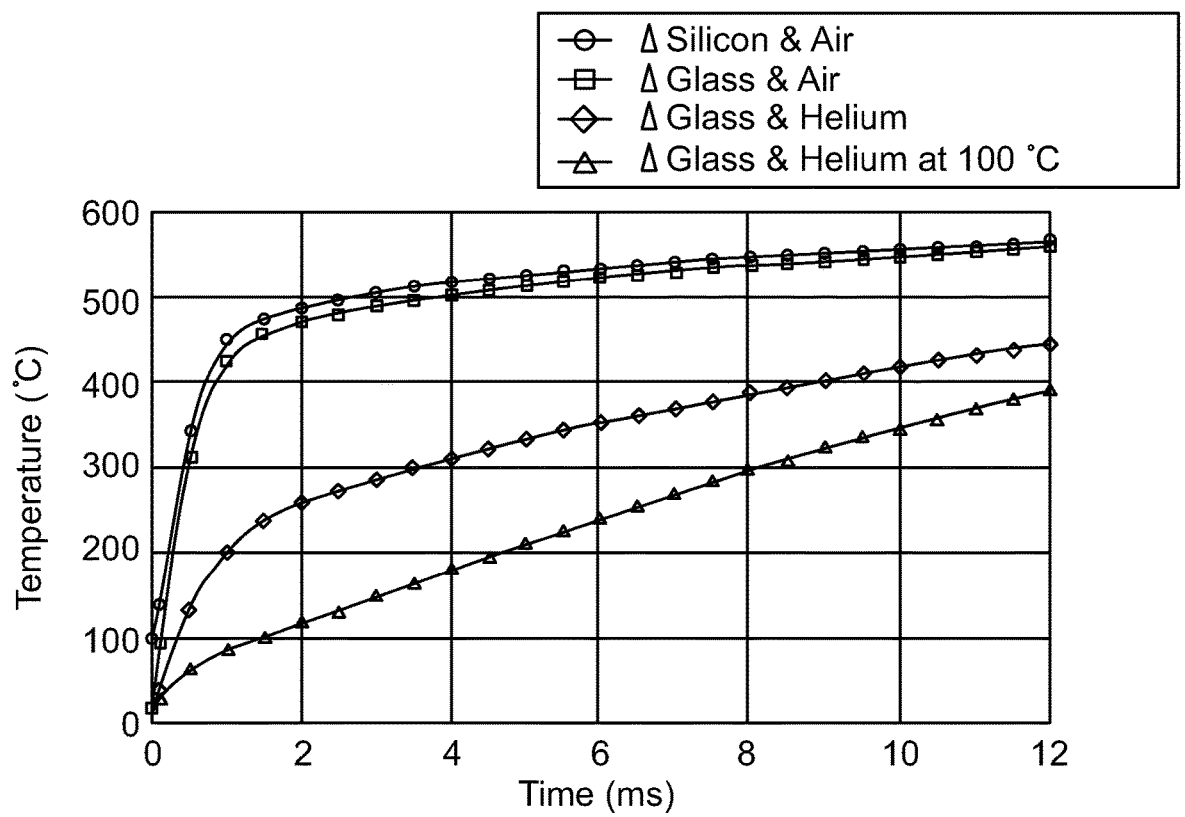
FIG. 20 shows temperature ramp of particles for each case.

It is seen that case 1 is very ineffective at adding heat to the particles when compared to the other cases due to the high thermal conductivity of a silicon substrate when compared to glass. The practical application of this information is to find the amount of time required to reach an acceptable temperature for sintering. It has already been established that a temperature of at least 440° C. is required to sinter a silver nanoparticle ink on a millisecond time scale. FIG. 20 shows the temperature ramp of the particle layer for each of the four cases. Maximizing the heat flux differential greatly reduces the time required to reach the sintering temperature: case 4 requires only 1.0 ms, and case 3 requires 1.2 ms; both are a vast improvement over the 12 ms time required for case 2. It is demonstrated that improvements to the embodiments of the present can be made with a larger thermal conductivity of the medium gas, a smaller thermal conductivity of the printing substrate, a microheater with higher operation temperature, or a smaller air gap. To improve the MAPS process and other embodiments of the present invention, a combination of these four variables could be changed; for instance, to allow a larger air gap, helium could be used as the conducting medium instead of air. Likewise, the air gap could be minimized, and a conducting medium of helium could be used to decrease the time required for sintering, thus allowing a faster operation.

In other embodiments, the system may be configured to increase the air gap to ~100 μm, which will significantly reduce the design and manufacturing complexity of the printing system and allow printing using larger particles as well as 3D-printing. There are two different approaches to increase the air gap.

One is to use a medium with higher thermal conductivity in the air gap and the other is the increase the microheater temperature. As was discussed above, helium or a plasma may be used as the conducting medium to increase the rate of heat transfer from the microheater into the powder. Helium has a thermal conductivity roughly an order of magnitude greater than that of air (0.142 W/(m×K) VS 0.024 W/(m×K)), which allows for an increase in the air gap by an order of magnitude (from 2 μm to 20 μm). Using an induction plasma, which would potentially have a higher thermal conductivity by an order of magnitude than normal helium, could allow for an increase of even further to ~100 s of microns.

Figure 21:
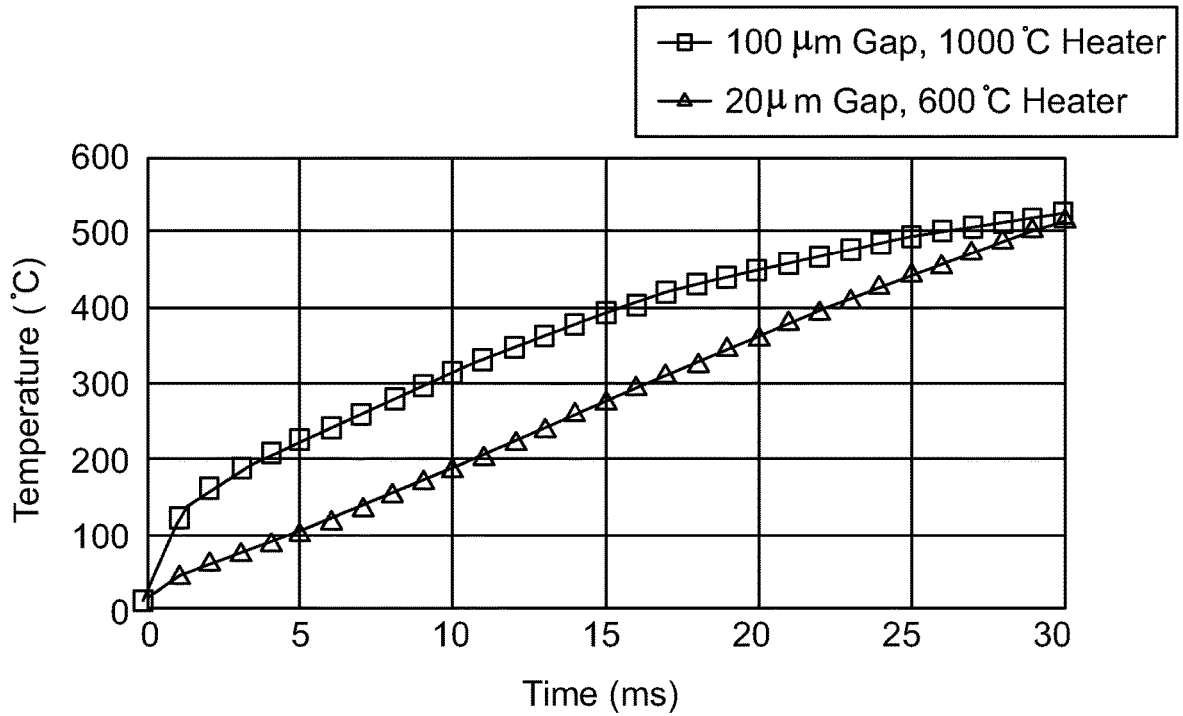
FIG. 21 shows temperature ramp of the surface of the powder particles with modified conducting medium and microheater operating temperatures.

Another method to increase the air gap would be to increase the temperature of the microheater. Platinum microheaters can be operated at temperatures up to 800° C., and Tungsten microheaters can be operated at temperatures up to 1200° C. One side benefit of increasing microheater temperature is that the thermal conductivity of gas increases with higher temperature. For example, the thermal conductivity of air increases to 0.08 W/(m×K) at 1000° C., which is almost four times of that at room temperature due to the higher degree of ionization at high temperature. By combining a microheater capable of higher temperatures with a more suitable conducting medium, the air gap can be increased to ~100 s μm. FIG. 21 illustrates the air gap that can be achieved by changing the conducting medium to helium and increasing the temperature of the microheater. By only changing the conducting medium to helium, a 20 μm gap is achieved, and increasing the operating temperature of the microheater to 1000° C. allows for an increase in the gap to 100 μm without significantly increasing the sintering time.

Figure 22:
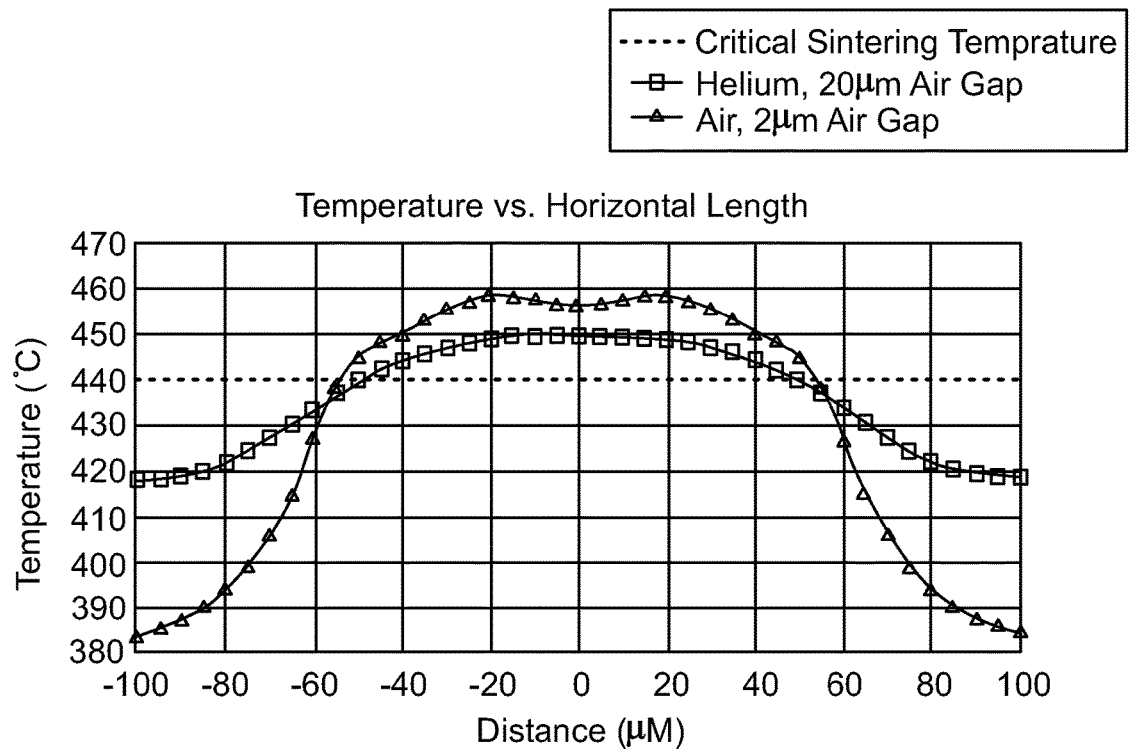
FIG. 22 shows the effects of increasing air gap where both of the curves are taken at a dwell time which achieves a 100 µm resolution, but the temperature profile along the powder layer becomes flat as the air gap is increased. This can be overcome by re-designing the microheater geometry and therefore the temperature profile. For example, instead of using a microheater that has uniform temperature distribution across its diameter, the microheater may be configured to have a higher temperature at the center and lower temperature at the outer edge.

FIG. 22 shows the comparison of the temperature profiles on the powder surface between an air gap of 20 μm and 2 μm. As shown, there is a balance between the heat source temperature, the speed, and the time of the heat transfer for minimizing the heating time and printing resolution. It should also be noted that the microheater only consumes 2.1 W of power while it is ramping to its operating temperature, but it only requires ~500 mW to maintain this temperature. In addition, the MAPS printer is a scalable printer.

Figure 23:
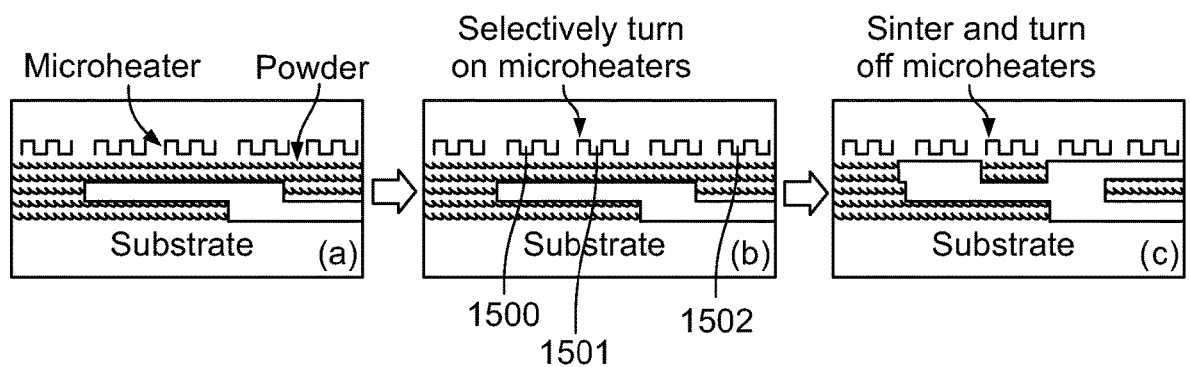
FIG. 23 illustrates a process of selectively applying localized heat to sinter powder particles using a microheater array to create predetermined patterns.

As shown in FIG. 23, in other embodiments, the system may use many microheaters in an array. By expanding the microheater into a large one-dimensional array of thousands of microheaters covering the entire width of the powder bed, printing can be achieved over an area by moving the printhead over the substrate in one single pass. This can eliminate the need to raster the printhead, significantly increasing speeds and digitizing the printing process. FIG. 23 further illustrates how an array of heaters can be used to sinter multiple areas of a powder bed at once by simply controlling when and how long a heater is activated. As shown, heaters 1500-1502 may be selectively activated to produce a pattern. Other control may be accomplished by varying the printing resolution (as discussed above). Yet other control of the printing area is accomplished by controlling the speed of printing, dwell times, current used and/or voltage used. FIG. 1A shows how a pattern may be created by controlling one or more of the above-described parameters for all heaters or selectively for each heater.

Lastly, the printhead described above may be incorporated into a roll-to-roll platform for high-speed production for printed electronics. Deposition of the material may be deposited by a roller assembly and processed past the printhead for further processing as known to those of skill in the art.

In other embodiments the present invention provides a printhead for selective heating of a material comprising. The embodiment includes a substrate and an array of one or more resistive heating elements arranged on a planar surface of the substrate. Also, each heating element is in electrical communication with a pair of interconnects. The interconnects contact the heating elements and then extend away from the planar surface. The interconnects may also extend along a portion of the planar surface before extending away from the planar surface. The interconnects may also extend through vias located in the substrate.

In other embodiments, the present invention provides a system for selective heating of a material. The system includes a first substrate, the first substrate is configured to support an array of one or more resistive heating elements arranged on a planar surface of the substrate. Each heating element is in electrical communication with a pair of interconnects. Also provided is a second substrate configured to support a material to be heated. The first and second substrates are positioned to form a gap between the resistive heating elements and the material. The embodiment may also include a drive to selectively position the resistive heating elements and the material with respect to one another.

Other embodiments include a configuration where the first substrates include a plurality of supports configured to rest upon the second substrate, the supports may be configured to maintain a parallel relationship between the heating elements and the material.

Other embodiments include a method for the selective heating and/or sintering of a material comprising the steps of: providing a first substrate, the first substrate is configured to support an array of one or more resistive heating elements arranged on a planar surface of the substrate. Each heating element in electrical communication with a pair of interconnects. Also include is the step of providing a second substrate configured to support a material to be heated and positioning the first and second substrates to form a gap between the resistive heating elements and the material. Another step is to selectively position and activate the resistive heating elements and the material with respect to one another to form a pattern of heated material.

The method may also include a closed-loop control that is used to control the activation of the heating elements. The heating elements function as temperature sensors for use by the closed-loop control.

In other aspects, the embodiments include systems and methods wherein each heating element consumes around 100s milliwatts to a few watts of power and reaches a temperature of around 600° C. or wherein each heating element consumes around 100s milliwatts of power and reaches a temperature of around 400° C.

In yet other embodiments, each heating element is a different shape and/or the heating elements functions as temperature sensors. In still other aspects, the substrates are configured to maintain a parallel gap between the heating elements and material to be heated. The heating elements may also be energized to heat predetermined sections of a material.

In still other embodiments, the heating elements are individually activated, and the heating resolution of each heating element is varied by the speed of printing, dwell times for each heating element, current used for each heating element and/or voltage used for each heating element. In certain preferred embodiments, the heating element is molybdenum disilicide and the heating elements achieve operating temperatures of around 1000° C. In other embodiments, the first substrate is sapphire, langasite, or alumina. The gap may also be filled with air, helium, plasma, or other medium with high thermal conductivity.

The first substrates and the second substrate may also be configured to maintain a parallel relationship between the heating elements and the material. Moreover, each heating element may be arranged consumes in the range of around 100 milliwatts to a few watts of power and reaches a temperature in the range of around 600° C. to 2000° C. In other aspects, the embodiments include systems and methods wherein the heating elements are individually activated and the heating resolution of each heating element is varied by the speed of printing, dwell times for each heating element, current used for each heating element and/or voltage used for each heating element, or the gap size between the first and second substrates. Moreover, the gap size may be adjustable. A contact sensor is used to establish the reference zero gap between the heating element and the second substrate. A precision stage is used to adjust the gap size with accuracy down to a few microns. In other embodiments, a gap sensor, such as a capacitive sensor or a laser sensor, can be used for closed-loop control of the gap for more precise control of the gap. While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A system for selective heating of a material comprising:
    a first substrate, said first substrate configured to support an array of one or more resistive heating elements arranged on a planar surface of said substrate;
    each heating element in electrical communication with a pair of interconnects;
    a second substrate configured to support a material to be heated;
    said first and second substrates positioned to form a gap between said resistive heating elements and said material; and
    a drive to selectively position said resistive heating elements and said material with respect to one another.

2. The system of claim 1 wherein said interconnects extend along a portion of said planar surface before extending away from said planar surface.

3. The system of claim 1 wherein said first substrates includes a plurality of supports configured to rest upon said second substrate, said supports configured to maintain a parallel relationship between said heating elements and the material.

4. The system of claim 1 wherein said heating element is molybdenum disilicide and said heating elements achieve operating temperatures of around 1000° C.

5. The system of claim 1 wherein said first substrate is sapphire, langasite, or alumina.

6. The system of claim 1 wherein said gap is filled with air, helium, plasma, or other medium with high thermal conductivity.

7. The system of claim 1 wherein said first substrates and said second substrate are configured to maintain a parallel relationship between said heating elements and the material.

8. A method for the selective heating of a material comprising the steps of: providing a first substrate, said first substrate configured to support an array of one or more resistive heating elements arranged on a planar surface of said substrate;
    each heating element in electrical communication with a pair of interconnects;
    providing a second substrate configured to support a material to be heated;
    positioning said first and second substrates to form a gap between said resistive heating elements and said material; and
    selectively positioning and activating said resistive heating elements and said material with respect to one another to form a pattern of heated material.

9. The method of claim 8 wherein a closed-loop control is used to control the activation of said heating elements.

10. The method of claim 9 wherein said heating elements function as temperature sensors for used by said closed-loop control.

11. The method of claim 8 wherein each heating element consumes around 100s milliwatts to a few watts of power and reaches a temperature of around 600° C.

12. The method of claim 8 wherein each heating element consumes around 100s milliwatts of power and reaches a temperature of around 400° C.

13. The method of claim 8 wherein each heating element is a different shape.

14. The method of claim 8 wherein said heating elements functions as temperature sensors.

15. The method of claim 8 wherein said substrates are configured to maintain a parallel gap between the heating elements and material to be heated.

16. The method of claim 8 wherein said heating elements are energized to heat predetermined sections of a material.

17. The method of claim 8 wherein said heating elements are individually activated and the heating resolution of each heating element is varied by the speed of printing.

18. The method of claim 8 wherein each heating element consumes in the range of around 100 milliwatts to a few watts of power and reaches a temperature in the range of around 600° C. to 2000° C.

19. The method of claim 8 wherein said heating elements are individually activated and the heating resolution of each heating element is varied by the speed of printing.

20. The method of claim 8 wherein said gap size is adjustable.

21. The method of claim 8 wherein a contact sensor is used to establish a reference zero gap between the heating element and the second substrate.

22. The method of claim 21 wherein a drive is used to adjust the gap size.

23. The method of claim 21 wherein a gap sensor is used for closed-loop control of the gap size.

24. The method of claim 23 wherein said gap sensor is a capacitive sensor or a laser sensor.

* * * * *